July 10, 1956
O. SCHADE
2,754,074
PARACHUTE WITH CONTROL MEANS
Filed Dec. 29, 1953
2 Sheets-Sheet 1
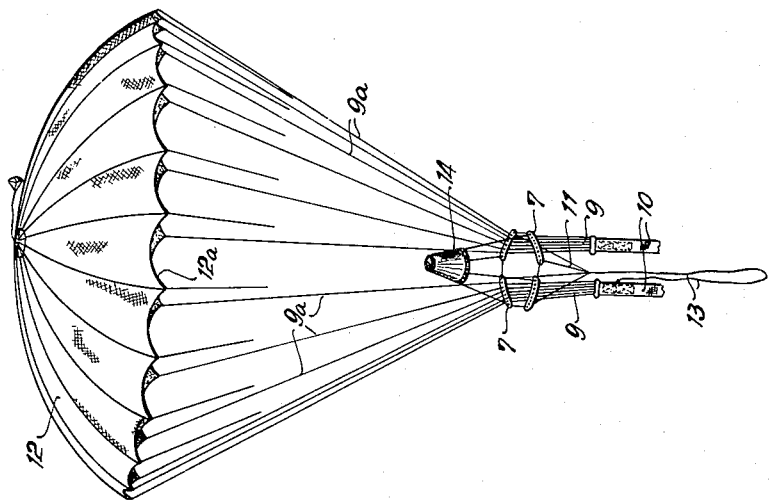
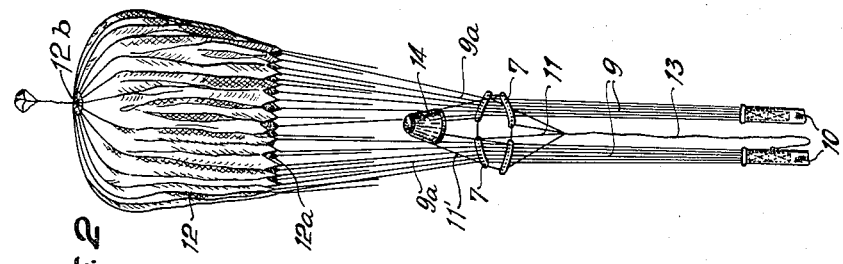
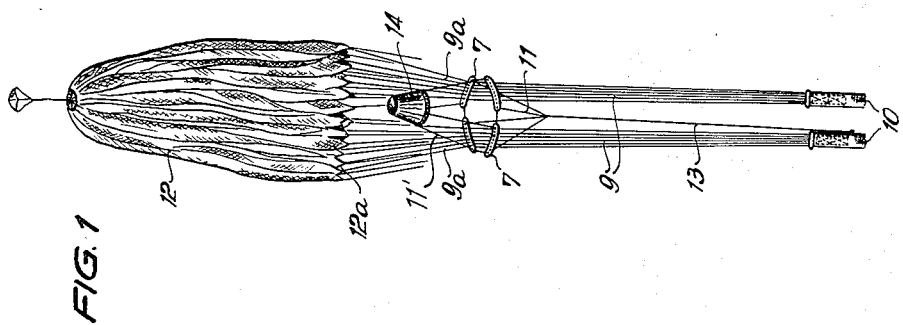
INVENTOR:
OSWALD SCHADE
BY:
Michael S. Striker
agt.

July 10, 1956
O. SCHADE
2,754,074
PARACHUTE WITH CONTROL MEANS
Filed Dec. 29, 1953
2 Sheets-Sheet 2
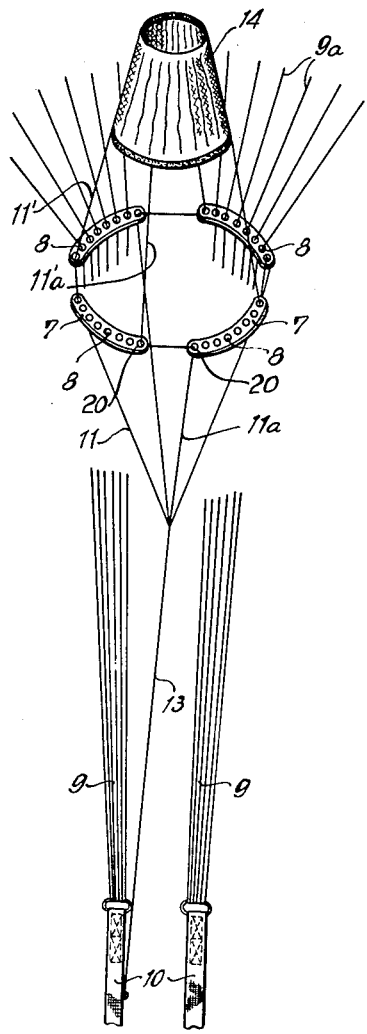
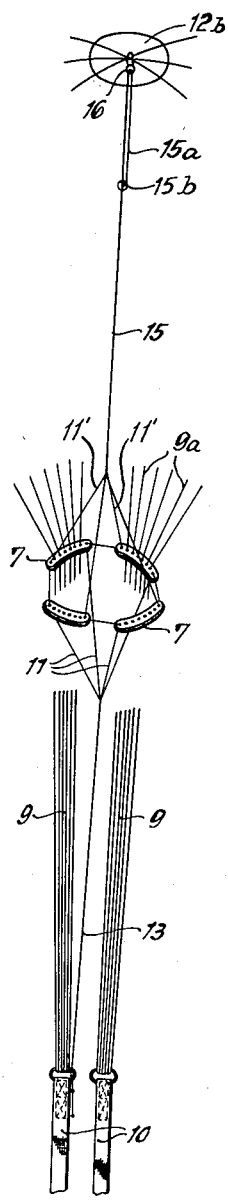
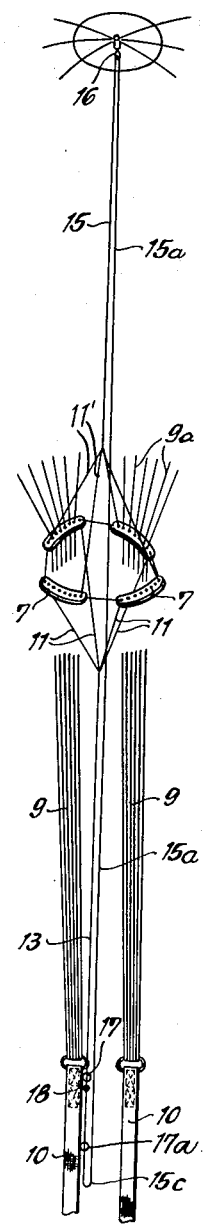
INVENTOR:
OSWALD SCHADE
BY:

United States Patent Office 2,754,074
Patented July 10, 1956

2,754,074

PARACHUTE WITH CONTROL MEANS

Oswald Schade, Witten (Ruhr), Germany

Application December 29, 1953, Serial No. 400,969

Claims priority, application Germany January 2, 1953

11 Claims. (Cl. 244—152)

The present invention relates to parachute devices. More particularly, the present invention relates to a parachute device which includes a means for lessening the opening shock produced by the rapid opening of the parachute canopy and for controlling the rate of vertical descent of the parachute.

The development of aviation, and particularly the increase in flying speed which has been brought about, has placed increased demands on the capabilities of parachutes. Furthermore, loads of increasing weight and size have been dropped by means of parachutes. However, the increase of the strength of the parachute by the use of stronger textile fabrics or the like is limited as a practical matter, in view of the particularly great stresses which occur at the moment of the opening shock of the parachute, since the resistance drag on the parachute increases with the square of the speed. In known types of parachutes the opening shock particularly with respect to great flying speeds is so great that it may lead to bodily injury. It has therefore become necessary in the development of parachutes to provide for damping the opening shock, that is, to keep the unfolding of the parachute canopy from being more or less jarring, and to control the stages of opening of the parachute.

Devices provided in prior art parachutes for controlling the rate of opening of the parachute have been found to be unreliable, and certain of these devices have depended on correct assembly during the folding of the parachute for proper and reliable operation thereof in the use of the parachute. Such prior art devices cannot be positively controlled when the parachute is in its extended unopened position.

It is an object, therefore, of the present invention to provide a parachute device which overcomes the disadvantages mentioned above.

It is another object of the present invention to provide a parachute device wherein the opening of the parachute may be controlled so as to avoid the shock of opening of the canopy.

It is still another object of the present invention to provide a parachute device of the above type wherein the opening of the canopy is automatically retarded.

It is still a further object of the present invention to provide a parachute device of the above type wherein the opening of the canopy may be automatically or manually controlled.

It is still another object of the present invention to provide a parachute device of the above type wherein means are provided to prevent the control device from keeping the canopy closed.

It is still another object of the present invention to provide a parachute device of the above type wherein the speed of falling thereof may be controlled.

Other objects and advantages will become apparent from the following description and the appended claims.

With the above objects in view, the present invention mainly consists in a parachute device which comprises in combination a canopy having an apex and a rim, shroud lines connected at one end to the canopy at circumferentially spaced points thereon, harness means connected to the shroud lines at the other ends thereof, gathering means engaging the shroud lines gathering the same together and slidable thereon for adjustably limiting the opening of the canopy, limiting means for limiting the movement of the gathering means toward the canopy, and control means for adjusting movement of the gathering means along the shroud lines, whereby the position of the gathering means along the shroud lines may be adjusted for controlling the speed and degree of opening of the canopy.

By means of the present invention, there is provided a parachute device wherein the gathering means moves into the proper position in the extended unopened position of the parachute, that is when the parachute is extended along its entire length before the canopy thereof has opened, independently of the position of the gathering means when the parachute is folded before use, while avoiding too high a position of the gathering means, which may lead to failure of the parachute to open, and avoiding too low a position, which would hinder the desired operation of the gathering means.

The highest position of the gathering means, that is, the position thereof nearest the canopy, may be limited in accordance with the invention by the provision of a central line which is connected at one end to the parachute harness and at its other end to the gathering means, and the control means for adjusting movement of the gathering means along the shroud line may comprise a sail member which is connected to the gathering means. The sail member prevents the gathering means from moving to too low a position in the extended condition of the parachute, since in this condition the rate of descent of the parachute, and, therefore, the drag force of the sail, is relatively great, whereby the gathering means is continuously drawn upwardly. An excessively high position of the gathering means on the shroud lines may be avoided by the above-mentioned central line which limits the uppermost position of the gathering means to the extent of the length of the central line.

By virtue of the control arrangement embodied in the present invention, the unfolding process of the parachute canopy is so controlled that the maximum force of the opening shock which has occured heretofore with prior known parachute devices is avoided. Parachutes whose maximum strength corresponds to a load of 100 kg. at a dropping rate of 400 km./h. have with the same load reached a dropping speed up to 600 km./h.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a view of a parachute device constructed in accordance with one embodiment of the invention, the parachute being shown in its extended unopened condition;

Fig. 2 is a view of the device of Fig. 1 showing the parachute in a partially opened condition;

Fig. 3 is a view of the device shown in Figs. 1 and 2 with the parachute in fully opened condition;

Fig. 4 is a detailed view of the control means incorporated in the embodiment shown in Figs. 1–3;

Fig. 5 is a schematic view of a different embodiment of the present invention; and Fig. 6 is a schematic view of still another embodiment of the present invention.

Referring now to the drawings and particularly to the embodiment shown in Figs. 1–4, there is shown a parachute having a canopy 12 to which is connected shroud lines 9 spaced circumferentially around canopy 12. Connected at the lower end of shroud lines 9 is a harness 10. Arranged on the shroud lines 9 is a gathering means, also referred to herein as a segment system, which is composed of four similar arcuate segments 7, which are preferably made of aluminum. The metal segments 7 are each formed with polished apertures 8 through which the shroud lines 9 are inserted, the shroud lines 9 passing through the inner six apertures, as more clearly shown in Fig. 4. Shroud lines 9 are arranged in apertures 8 of segments 7 in the same order in which the shroud lines are connected to the base rim 12a of the parachute canopy 12, and, further, are arranged in the groups in which they are fastened to the harness 10.

Through the two outer apertures of each metal segment 7 there are passed control wires or ropes 11 and 11' which are so arranged that they hold the four segments 7 in the same plane when the guy wires are taut, that is when the parachute is in unfolded condition. To upper control wires or ropes 11' there is attached, in the embodiment illustrated in Figs. 1–4, a sail member 14 which is preferably of conical shape, and to the lower control wires or ropes 11 there is attached a lower line 13 which is connected at its lower end to harness 10.

In Figs. 4–6 the structure of segments 7, which constitute the gathering means for the shroud lines 9, and the arrangement of the control wires or ropes 11—11' are more clearly shown. The shroud lines 9 only of the rear segments 7 are shown in these figures.

Metal segments 7 are slidably movable on shroud lines 9, and they are thereby adjustable to various positions therealong. The closer the gathering or segment system 7 lies to the base rim 12a of the parachute canopy 12 in the open condition of the parachute, the shorter are the free lengths 9a of the shroud lines 9, that is, the portions of the shroud lines 9 which extend from the segments 7 to the base rim 12a. In the first stage of unfolding of the parachute, that is, the fully extended unopened condition of the parachute, as shown in Fig. 1 of the drawing, the segment system 7 preferably takes its highest position, as shown in Fig. 1. In this way, the air entrance opening is deliberately kept small whereby the unfolding of canopy 12 is delayed. The air pressure within the upper portion of canopy 12 due to the great rate of descent nevertheless increases rapidly, and the parachute takes a so-called "club" form, such as shown in Fig. 2. In prior art parachute devices, the complete unfolding of the canopy 12 at this stage then takes place with a more or less jarring effect. This opening shock, particularly at high dropping speeds, is so great that the parts of the parachute may be strained beyond their breaking points. Furthermore, there is produced thereby danger of bodily injury to the jumper.

As is apparent from the showing in Figs. 1–3, the segment system 7 is drawn up, in the extended condition of the parachute (Fig. 1), to its uppermost position in a positive manner. The short free length 9a of shroud lines 9 do not allow a rapid enlargement of the air entrance opening of the canopy 12, since due to a preliminary spreading of the base rim 12a, the upper portions 9a of the shroud lines are spread outwardly with respect to the lower portions of the shroud lines below segment system 7, and in this way the shroud lines are subjected to a frictional resistance in the apertures 8 of the segments 7. Accordingly, the upper portions 9a of the shroud lines are somewhat held in their existing lengths, so that a rapid opening of the base rim 12a is prevented. In accordance with the resultant force produced on the segment system 7 on the one hand by the outwardly spreading shroud line portions 9a and on the other hand by the frictional resistance on the shroud lines 9 exerted by the segment system 7, the segment system 7 slides downwardly until the said frictional resistance thereof again predominates and a further unfolding of the canopy 12 is prevented. Both of these actions merge together in actual operation, so that a continuous movement of the segment system 7 to its lowest position (Fig. 3) takes place. In this way, an uncontrolled and jarring unfolding of canopy 12 is avoided.

The construction of the device according to the invention is schematically shown in Figs. 4–6. In the embodiment shown in Fig. 4, as pointed out above, a conical sail member 14 is provided which due to air pressure during the dropping of the parachute draws the gathering system 7 upwardly so that the gathering system attains its uppermost position in the extended unopened condition of the parachute shown in Fig. 1, this uppermost position being limited by the length of the lower most line 13. When the segment system 7 slides downwardly, the lower line 13 hangs loosely (Figs. 2 and 3).

Fig. 4 clearly shows apertures 20 at the ends of segments or slide members 7, and that control wires or ropes 11—11' and 11a—11a' pass through apertures 20 at the end of adjacent slide members 7. Slide members 7 have to be arranged equidistant from apex 12b when the parachute is folded and packed. During opening of the descending parachute, the control wires will become taut and the tension will form the slide members into a position perpendicular to the long axis of the system of control ropes and transverse to the control ropes. During vertical descent, the slide members will thus be positioned in one horizontal plane, provided that, as stated above, the slide members have been arranged at equal distance from the apex of the parachute during the packing of the same.

Fig. 5 illustrates another embodiment of the present invention. In this embodiment, the lower line 13 is also provided, but instead of a sail member 14 as shown in Fig. 4, there is provided an upper line 15, which extends upwardly to the apex 12b of the canopy 12. At apex 12b an eyelet member 16 is attached, through which the upper line 15 is passed. The lower end of upper line 15 is connected, similarly to sail member 14, to upper control wires or ropes 11', while the other end of upper line 15 is fastened by means of a slidable knot 15b to a part of line 15 spaced somewhat below eyelet member 16. The knot 15b is so fastened to line 15 that the loop 15a formed thereby is contractible when line 15 is drawn downwardly. Loop 15a serves to provide for extension of line 15 downwardly during the downward movement of segment system 7. This extension of line 15 provided by loop 15a corresponds to the distance which the segment system 7 moves away from the apex 12b, as shown in the relative spacing of the segment system from the apex illustrated in Figs. 1–3. The slide resistance of loop 15a is sufficient to restrain the upper line 15 at the moment of extension of the parachute to the position shown in Fig. 1, so that the segment system 7 is drawn upwardly as far as the length of lower line 13 permits. Too low a position of the segment system 7, which would not allow proper operation of the present invention, is avoided by this restraint from above.

The embodiment shown in Fig. 5 may be modified to provide different constructions, as, for example, by combining the sail member 14 together with the upper line 15 to thereby provide for an upward restraint on the segment system 7. Furthermore, instead of providing a contractible loop 15a, the upper end of upper line 15 may merely be formed with a knot without being directly attached to the line 15 itself, the size of the eyelet member 16 through which line 15 passes being made small enough to provide the desired frictional resistance to the passing of the line therethrough during downward pulling of the line 15. In these embodiments corresponding to the Fig. 5 construction, it is only necessary that the sliding friction provided in the apex eyelet be greater than the friction exerted against the shroud lines 9 by the segment system 7. In the extended position of the parachute, the shroud lines 9 are nearly parallel from the harness 10 to the canopy rim 12a. The frictional resistance exerted by segment system 7 first occurs when the upper portions 9a of the shroud lines begin to spread out during the opening of the parachute canopy. The force components which are directed downwardly are then so great that the frictional resistance provided by the apex eyelet 16 is overcome, and the extension provided by the contractible loop 15a or the loosely hanging knotted end of the line 15 which passes through the eyelet member 16 then comes into effect.

Fig. 6 shows a particularly advantageous construction of the present device. In this embodiment, the upper line 15 is also passed through an eyelet member 16 at the apex of canopy 12, but instead of forming a loop as shown in Fig. 5, line 15 extends with a lower portion thereof down to the harness 10 through the segment system 7, the lower end 15b being connected to the line 13. Both lines 13 and 15 thereby form a continuous line. The lower line 13 is not fixedly attached to harness 10, but rather passes through guide rings 17–17a which are attached to harness 10 spaced from each other, and line 13 then continues into portion 15b which extends upwardly and through the apex eyelet 16. The portion of line 13 between the two guide rings 17–17a is provided with a stop knot 18, whereby the uppermost position of the segment system 7 is limited in a manner analogous to the embodiments shown in Figs. 4 and 5. The spacing of the two guide rings 17–17a, as well as the downwardly hanging portion 15c of line 15, provides the necessary extension of the line 15 in a manner analogous to the loop 15a shown in Fig. 5. The proper control of the adjusting system in the extended position of the parachute is, therefore, also assured by this arrangement.

In addition, it is also possible by means of the line 15b to act on line 15 from above the control system. By pulling on this continuous line, the jumper can retard the downward sliding of the segment system 7, so that the unfolding of the parachute may be delayed for a prolonged period. He can himself again raise the segment system 7 after it has slid downwardly and thereby can again return the parachute to the stages of unfolding shown in Figs. 2 and 1. This control of the inflation of the parachute while it is dropping places the jumper in a position to increase his rate of descent for the purpose of avoiding an unfavorable landing place on which he would have been expected to drop under a normal rate of descent due to the influence of drift. The jumper may, also, by pulling down on line 13, cause the canopy 12 to open further so as to reduce the rate of descent.

It will be understood that each of the elements described above, or two or more together, may also find a useful application in other types of parachute device differing from the types described above.

While the invention has been illustrated and described as embodied in parachute opening control device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be secured by Letters Patent is:

1. A parachute device, comprising, in combination, a canopy having an apex and a rim; shroud lines connected at one end to said canopy at circumferentially spaced points thereon; harness means connected to said shroud lines at the other ends thereof; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and to said harness means and being connected at the other set of ends thereof to each other, each of said control ropes slidably passing through two of said apertures respectively located in adjacent gathering means.

2. A parachute device, comprising, in combination, a canopy having an apex and a rim; shroud lines connected at one end to said canopy at circumferentially spaced points thereon; harness means connected to said shroud lines at the other ends thereof; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and to said harness means, each of said control ropes slidably passing through two of said apertures respectively located in adjacent gathering means; and actuating means connecting the other set of ends of said control ropes and adapted to offer resistance during the movement through air.

3. A parachute device, comprising, in combination, a canopy having an apex and a rim; shroud lines connected at one end to said canopy at circumferentially spaced points thereon; harness means connected to said shroud lines at the other ends thereof; a plurality of arcuate slide members each formed with a series of apertures through which said shroud lines pass, said slide members gathering said shroud lines together and being slidable thereon for adjustably limiting the opening of said canopy; and control means including a plurality of control ropes, said control ropes being connected at one set of ends thereof to each other and to said harness means and being connected at the other set of ends thereof to each other, each of said control ropes slidably passing through two of said apertures respectively located in adjacent slide members; and actuating means connected to the other set of ends of said control ropes and adapted to move apart said sets of ends of said control ropes.

4. A parachute device, comprising, in combination, a canopy having an apex and a rim; shroud lines connected at one end to said canopy at circumferentially spaced points thereon; harness means connected to said shroud lines at the other ends thereof; a plurality of arcuate slide members each formed with a series of apertures through which said shroud lines pass, said slide members gathering said shroud lines together and being slidable thereon for adjustably limiting the opening of said canopy; and control means including a plurality of control ropes, said control ropes being connected at one set of ends thereof to each other and to said harness means, each of said control ropes slidably passing through two of said apertures respectively located in adjacent slide members; and actuating means connecting the other set of ends of said control ropes and adapted to offer resistance during the movement through air.

5. A parachute device, comprising, in combination, a canopy having an apex and a rim; shroud lines connected at one end to said canopy at circumferentially spaced points thereon; harness means connected to said shroud lines at the other ends thereof; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and to said harness means, each of said control ropes slidably passing through two of said apertures respectively located in adjacent gathering means; and actuating means comprising a frusto-conical tubular sail member connecting the other set of ends of said control ropes and adapted to offer resistance during the movement through air.

6. A parachute device, comprising, in combination, a canopy having an apex and a rim; shroud lins connected at one end to said canopy at circumferentially spaced points thereon; harness means connected to said shroud lines at the other ends thereof; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and to said harness means and being connected at the other set of ends thereof to each other and to said canopy at the apex of the same, each of said control ropes slidably passing through two of said apertures respectively located in adjacent gathering means.

7. A parachute device, comprising, in combination, a canopy having an apex and a rim, and having an eyelet member at said apex; shroud lines connected at one end to said canopy at circumferentially spaced points thereon; harness means connected to said shroud lines at the other ends thereof; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and to said harness means and being connected at the other set of ends thereof to each other; and an actuating line connected to said other set of ends of said control ropes and passing through said eyelet members at said apex of said canopy, each of said control ropes slidably passing through two of said apertures respectively located in adjacent gathering means.

8. A parachute device, comprising, in combination, a canopy having an apex and a rim, and having an eyelet member at said apex; shroud lines connected at one end to said canopy at circumferentially spaced points thereon; harness means connected to said shroud lines at the other ends thereof; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and to said harness means and being connected at the other set of ends thereof to each other; and an actuating line connected at one end thereof to said other set of ends of said control ropes, passing through said eyelet member at said apex of said canopy, and being bent upon itself, the other end of said line being slidably connected to said line so as to form a slip noose, each of said control ropes slidably passing through two of said apertures respectively located in adjacent gathering means.

9. A parachute device, comprising, in combination, a canopy having an apex and a rim, and having an eyelet member at said apex; shroud lines connected at one end to said canopy at circumferentially spaced points thereon; harness means connected to said shroud lines at the other ends thereof; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and to said harness means and being connected at the other set of ends thereof to each other; and an actuating line having one end connected to said other set of ends of said control ropes and passing through said eyelet member at said apex of said canopy and being connected at its other end to said harness means, each of said control ropes slidably passing through two of said apertures respectively located in adjacent gathering means.

10. A parachute device comprising, in combination, a canopy having an apex and a rim, and having an eyelet member at said apex; shroud lines connected at one end to said canopy at circumferentially spaced points thereon; harness means connected to said shroud lines at the other ends thereof; at least one ring member fixed on said harness means; a plurality of gathering means engaging said shroud lines gathering the same together and slidable thereon for adjustably limiting the opening of said canopy, said gathering means being formed with apertures; and control means including a plurality of control ropes, said control ropes being connected at one set of ends thereof to each other and being connected at the other set of ends to each other, each of said control ropes slidably passing through two of said apertures respectively located in adjacent gathering means; and an actuating line having one end connected to said other set of ends of said control ropes and passing through said eyelet member at said apex of said canopy and through said ring member on said harness and being connected on its other end to said one set of ends of said control ropes.

11. A parachute device comprising, in combination, a canopy having an apex and a rim; shroud lines connected at one end to said canopy at circumferentially spaced points thereon; harness means connected to said shroud lines at the other ends thereof; a plurality of arcuate slide members arranged in end to end relationship each formed with a series of apertures through which said shroud lines pass and with two end apertures formed at the ends of said slide members, said slide members gathering said shroud lines together and being slidable thereon for adjustably limiting a plurality of control ropes, said control ropes being connected at one set of ends thereof to each other and to said harness means and being connected at the other set of ends thereof to each other, each of said control ropes slidably passing through two adjacent end apertures of two adjacent slide members, and actuating means connected to the other set of ends of said control ropes and adapted to move apart said sets of ends of said control ropes.

References Cited in the file of this patent

UNITED STATES PATENTS

| | | |
|---|---|---|
| 1,266,508 | Ludtke | May 14, 1918 |
| 2,308,797 | Nasca | Jan. 19, 1943 |
| 2,511,601 | Smith | June 13, 1950 |
| 2,525,798 | Haftan | Oct. 17, 1950 |
| 2,566,585 | Smith | Sept. 4, 1951 |
| 2,610,008 | Smith | Sept. 9, 1952 |

FOREIGN PATENTS

| | | |
|---|---|---|
| 483,042 | Germany | July 5, 1930 |